(12) United States Patent
Balinsky et al.

(10) Patent No.: US 9,400,769 B2
(45) Date of Patent: Jul. 26, 2016

(54) DOCUMENT LAYOUT SYSTEM

(75) Inventors: Helen Balinsky, Cardiff Wales (GB); Anthony Wiley, Bristol (GB); Matthew Roberts, Caldicot Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1786 days.

(21) Appl. No.: 12/537,131

(22) Filed: Aug. 6, 2009

(65) Prior Publication Data

US 2011/0035661 A1 Feb. 10, 2011

(51) Int. Cl.
*G06F 17/00* (2006.01)
*G06F 17/21* (2006.01)

(52) U.S. Cl.
CPC ............. *G06F 17/21* (2013.01); *G06F 17/218* (2013.01)

(58) Field of Classification Search
CPC . G06F 17/212; G06F 17/211; G06F 17/2785; G06F 17/2294; G06F 17/248; G06F 17/218; G06F 17/21
USPC .................................. 715/205, 234; 382/112
See application file for complete search history.

(56) References Cited

U.S. PATENT DOCUMENTS

| | | | |
|---|---|---|---|
| 2004/0205568 A1* | 10/2004 | Breuel et al. | 715/513 |
| 2005/0028099 A1* | 2/2005 | Harrington et al. | 715/530 |
| 2006/0026508 A1* | 2/2006 | Balinsky | G06F 17/211 715/246 |
| 2006/0174568 A1* | 8/2006 | Kinoshita et al. | 52/395 |
| 2006/0179405 A1 | 8/2006 | Chao et al. | |
| 2007/0041619 A1* | 2/2007 | Harrington et al. | 382/112 |
| 2007/0133842 A1* | 6/2007 | Harrington | 382/112 |
| 2008/0077880 A1 | 3/2008 | Oygard | |
| 2009/0110288 A1* | 4/2009 | Fujiwara | 382/190 |

FOREIGN PATENT DOCUMENTS

JP 2008052739 A 3/2008

OTHER PUBLICATIONS

Chao, H. et al., "Layout and Content Extraction for PDF Documents", Springer-Verlag Berlin Heidelberg, 2004.
Duda, R. O. et al., "Use of the Hough Transformation to Detect Lines and Curves in Pictures", Communications of the ACM, vol. 15, No. 1, Jan. 1972.

* cited by examiner

*Primary Examiner* — Scott Baderman
*Assistant Examiner* — Howard Cortes
(74) *Attorney, Agent, or Firm* — HP Inc. Patent Department

(57) ABSTRACT

A method for generating a document, comprising providing a set of content items in a first configuration for the document, using a processor, generating alignment data representing a measure for the alignment of the content items in the first configuration, using the alignment data to determine if the content items are aligned with one another within a predefined threshold measure for alignment for the document, and a document layout system comprising a processing module configured to generate a document layout.

7 Claims, 13 Drawing Sheets

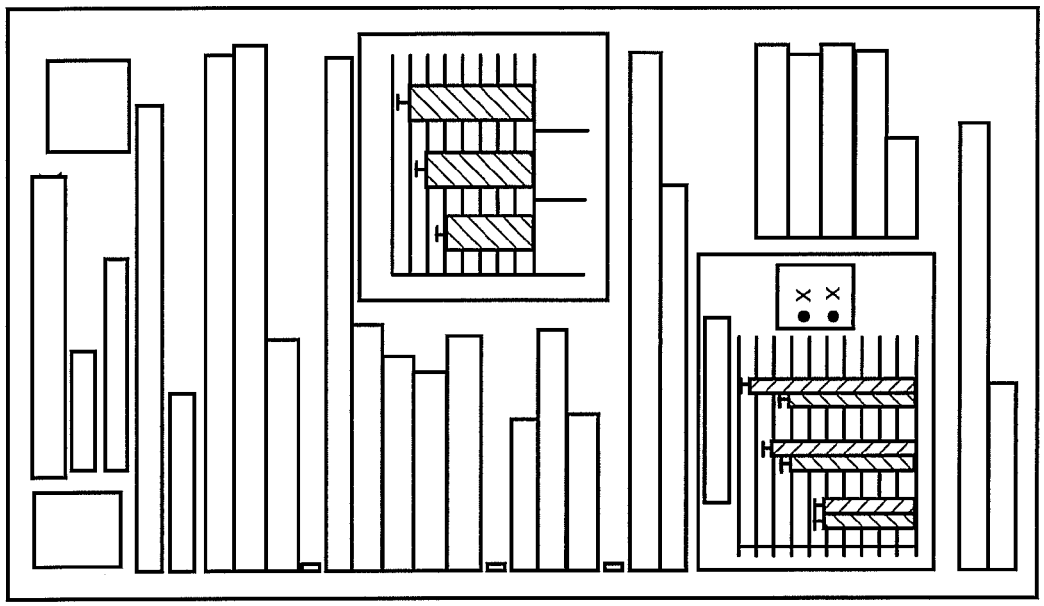
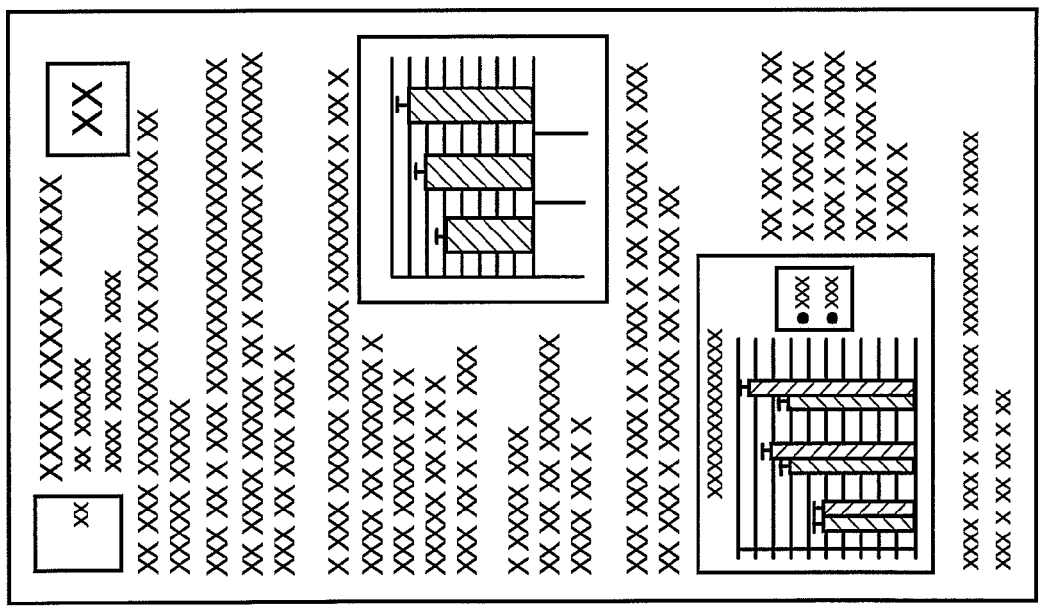
Fig. 3(a)
Fig. 3(b)

protruding object

DOCUMENT LAYOUT SYSTEM

BACKGROUND

In an automatic publishing system utilizing, for example, a digital printing press, a document can be tailored for individual clients. For example, although the majority of the content of a document may remain constant across a client base, there may be a need to alter certain characteristics or portions of the content on a client by client basis. This will result in a set of documents which differ in either layout or content, or by a combination of the two resulting in personalized and customized documents.

To be effective as communications or sales tools, such documents must continue to be visually appealing and aesthetically pleasing, despite having been adjusted in some way from an initial design. Producing, for example, millions of unique versions of essentially the same document not only presents challenges to the printing process but also disrupts standard quality control procedures which may be in place. The quality of the alignment of each document can easily distinguish a professionally looking document from an amateur design and some computer generated layouts.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIGS. 3a-d depict a schematic representation of an a) original document; b) individual objects extracted from the document of a); c) all alignment lines marked; d) Large Perceptual Objects (LPOs) with contributing lines;

FIG. 10 is a Hough map of the image of FIG. 6a;

DETAILED DESCRIPTION

Figure 1:
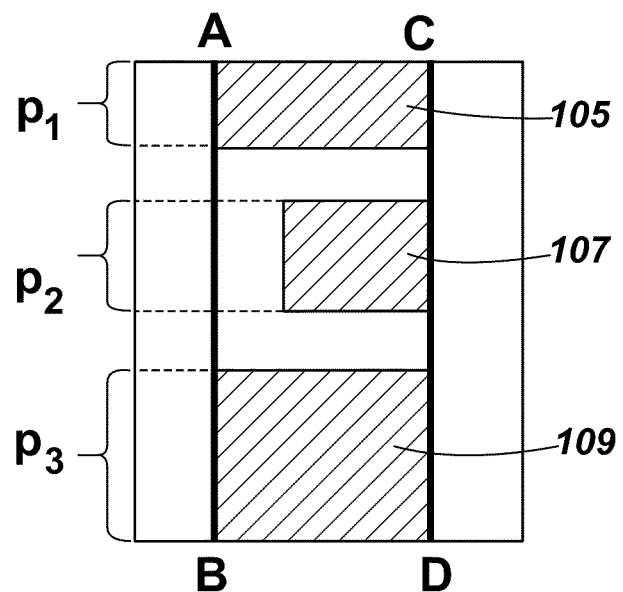
FIG. 1 is a schematic representation of the strength of two alignment lines.

For a set of documents which have been tailored to match the interests of individual users using an automatic publishing system, the following non-exhaustive list of alignment and regularity related document issues can cause a document from the set to look as if it has not been produced in professional way which is consistent with the needs and desires of the creator:

too many local alignment lines, but dominant ones are missing thus a document lacks a well-formed structure and appears to look cluttered;

some objects are aligned to nothing, some even fall out of the page composition;

some nearly aligned objects appear to be visibly misaligned;

too many protruding/recessed objects disturb alignment quality of important document edges;

the document lacks internal proportionality, so the sizes of objects look rather random.

In order to present a document in a form which is visually appealing, aesthetically pleasing, and simple to navigate such that key points can be determined without much effort on the part of a reader, it is important that certain aesthetic criteria are adhered to in the production of a document. Such criteria are should be especially followed in the situation where a document is reformatted and/or has content changed in order to customize it for a certain audience, such as a specific customer. In this regard, it is important that portions of content which form a document are well aligned, well balanced, have a pleasing look and are easy to navigate. In order to effectively generate a document which fulfills the necessary criteria, certain characteristics of the document need to be extracted.

According to an embodiment, alignment lines for a document can be extracted as follows:

Extraction of low-level document primitives (content portions) such as blocks of text, images and graphical objects for example;

Using principles of perceptual grouping, clustering of document primitives into Large Perceptual Objects (LPOs);

Extraction of alignment lines from text block LPOs;

Extract alignment lines generated by images using, for example, the Hough transform;

Analysis of graphical objects and extraction of the corresponding alignment lines;

Extract alignment lines from combinational objects.

It will therefore be appreciated that, according to an embodiment, there is provided a method to extract document alignment lines and to enable the evaluation of a measure of the quality of document alignment and regularity with respect to pre-established requirements for a given document class/type/style.

Accordingly, a computational multi-component measure of alignment and regularity is introduced to provide a framework to address all of the above problems or any relevant subset thereof. The results are easily interpretable and controllable by graphic designers. Whilst the importance and relevance of the various components of alignment could be derived statistically for different document types/styles, it is more important for designers to be able to adjust/set the relevance values when a document is designed.

Herein, an alignment line is an imaginary line that is perceived whilst (at best) being only partially drawn. In other words, it is a simple illusory contour that is perceived without a luminance or color change across the contour. A document's entirety and 'wholeness' emerge as a result of document parts, or content items, being aligned to each other. Alignment lines join document parts into a whole.

According to an embodiment, an active part of an alignment line is a fragment of this line that belongs to a document object. Each alignment line always has one or more active parts. Herein, alignment line weight is the number of active parts or objects whose edges are aligned along this line, whilst the strength of an alignment line is the ratio of the sum of all its active parts to the total length of the alignment line.

FIG. 1 is a schematic representation of the strength of two alignment lines AB, CD which are alignment lines for three objects 105, 107, 109. Accordingly, the strength of the alignment line AB, $s_{AB}=(p_1+p_3)/|AB|$, whilst the strength of the alignment line CD, $s_{CD}=(p_1+p_2+p_3)/|CD|$. Accordingly, it can be seen that $s_{AB}<s_m$. The total length of the alignment line is usually the corresponding size (width/height) of the consumer area of a document. Alignment line strength, always a non-negative number in the interval (0,1], indicates how much of the alignment line is actually drawn by means of some object edges. The normalized strength helps distinguish cases where the active part of an alignment line consists of just a few, or a multitude of pieces. Accordingly, the normalized strength of an alignment line is the ratio of its strength to its weight, which indicates the average size of active parts of an alignment line.

Figure 2:
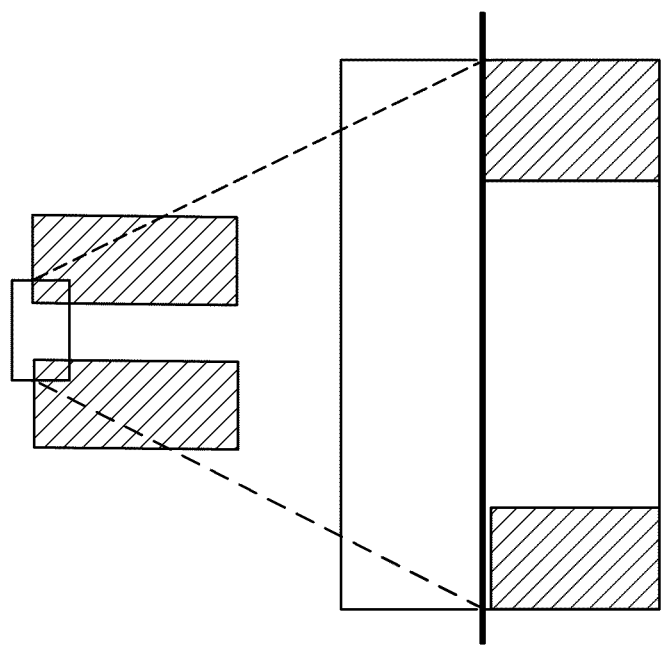
FIG. 2 is a two rectangles are not strictly aligned, but appear to be visually aligned.

In reality, due to the limited resolution of the human eye, a precise mathematical alignment is not required. For example, as shown in FIG. 2, which depicts two visually well aligned rectangles which, under closer examination, are not strictly aligned.

Exact mathematical alignment means the object edges share the same coordinates. Due to limited eye resolution exact mathematical alignment is often not required since a user cannot detect (see) misalignment. To address this consider a generalized alignment line, which is a non-zero width alignment line; all objects whose edges lie within this line appear to be visibly aligned. Thus, objects are considered to be well aligned even though their edges do not lie on the exact same mathematical line, but close enough to be undetected by the human eye. Several factors can influence the acceptable width of a generalized alignment line with document resolution being one of the most important. Other contributing factors are:

Spatial separation of active parts of an alignment line: the further apart the nearly aligned objects are, the less detectable the actual misalignment becomes;

Proximity to a document boundary, strong edge or active part of other alignment line (which serves as a reference point) increases the detectability of even a slight misalignment.

One of the most challenging aspects in the automatic evaluation of alignment and regularity is the extraction of contributing alignment lines. In contrast with low complexity graphical user interfaces where alignment lines are almost exclusively generated by edges of controls and graphical indicators, an average document contains an avalanche of alignment lines, the majority of which do not even contribute to the overall document alignment. Whilst very important for object level comprehension and appearance, low level alignment lines do not form part of the document level structure and thus must be excluded from document-level alignment evaluation. For example:

internal lines inside a block of text;
internal rows of tables and all associated lines;
internal lines of graphical objects and images;
boundary lines for images and graphics that are overlapped by other objects;
edges of images and graphical objects with a transparent or matching surrounding color background;
whole common edges closely shared by two individual images;

should not be taken into account when evaluating document alignment.

A lack of essential differences between non-contributing and contributing alignment lines can complicate matters. As such, the relevance of a particular alignment line to the overall alignment quality often cannot be established just based on the properties of the line itself, but rather it depends on its surrounding context. For example, any contributing alignment line of text can be converted into an internal line just by adding one more line of text and vice versa. The severity of the problem is illustrated in FIGS. 3*a-d*, where a document, all its objects, all extracted alignment lines and only the contributing alignment lines are each shown in turn.

Human perception can make us feel that some objects should be grouped together. This is due to factors such as common edges between objects, object proximity and containment. The grouping of the page into perceptual objects is particularly important when we are looking at the structure of a page. In such a case, we may not be interested in the exact location of every line of text or where every line in a bar chart lies, we simply need to know how the page is grouped. Therefore, we introduce the notion of Large Perceptual Objects. Herein, a Large Perceptual Object (LPO) is defined as an object or group of objects on a page of a document that perceptually appear to be independent of other objects on a page, e.g. a paragraph, column, image and caption group, etc. This independence is likely to be enforced by an object being well-separated from other objects on a page, for example, by non-occupied, so called 'white' space. Also, we call these objects large not because they necessarily occupy a substantial part of a page, but to distinguish them from 'small' objects, like individual letters or words. According to an embodiment all contributing alignment lines are generated by the outer most LPO edges, whilst noncontributing lines are internal to an LPO.

Figure 3D:
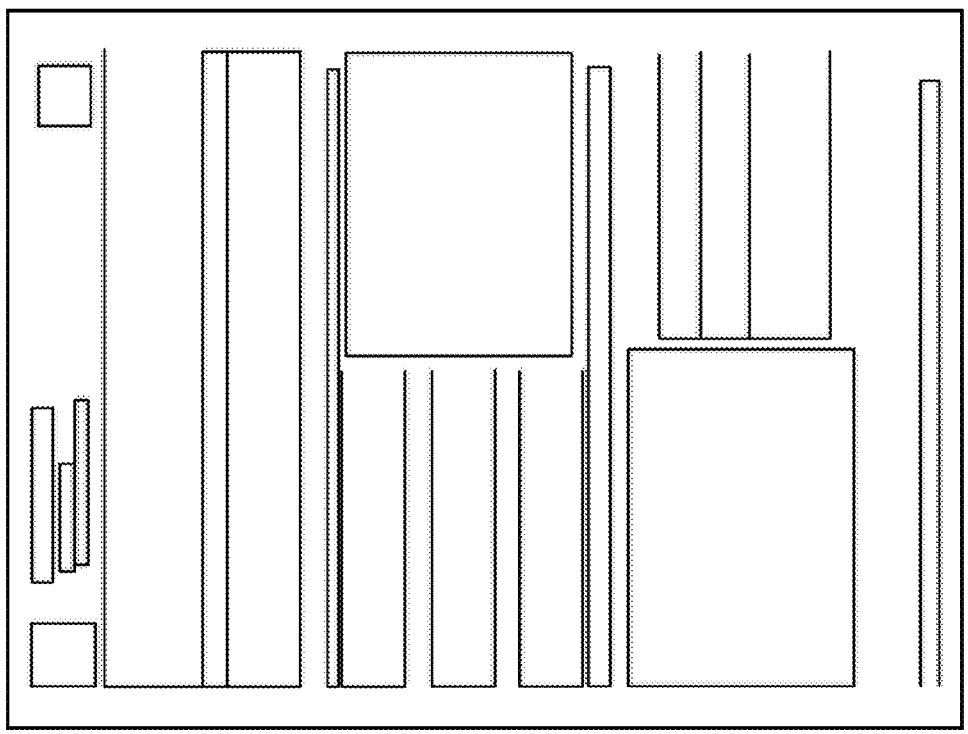
Figure 3C:
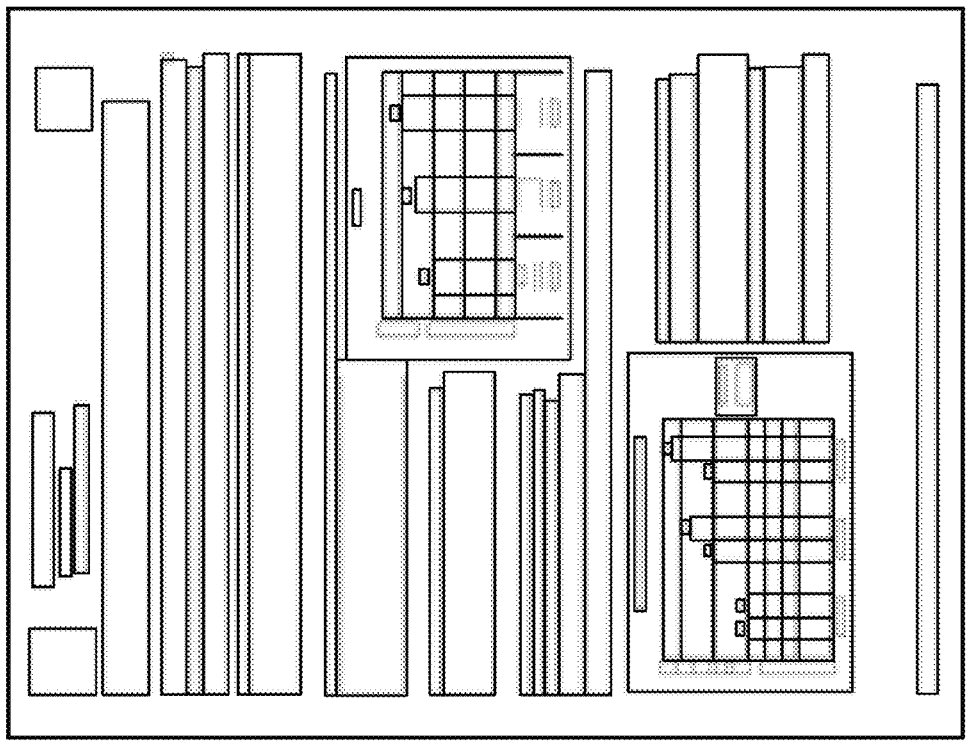

FIG. 3*a* is a schematic representation of an original document. In FIG. 3*b*, the individual objects have been extracted from the original document using a method as will be described below. FIG. 3*c* shows all alignment lines which have been marked following extraction of individual objects, and FIG. 3*d* shows corresponding LPOs with contributing lines.

Figure 4A:
FIG. 4 is a schematic representation depicting LPOs assigned a text block (4a) and an image (4b)
Figure 4B:
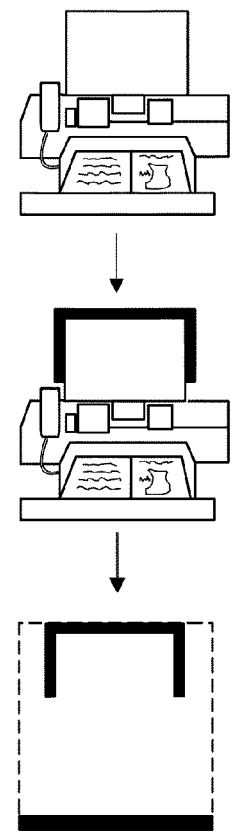

For vertical and horizontal alignment each LPO can be associated with up to four straight edges: top, bottom, left and right. Which of these are assigned depends on the actual contents of an LPO: it may have no alignment edges or only some. For example, as shown in FIG. 4, which depicts LPOs assigned to a text block and to an image. The visible outer edge of an LPO does not necessarily coincide with the corresponding side of the LPO bounding box, either in location, or in size, but they are obviously parallel. Assigning no more than one to each side of an LPO might seem like an over simplification of the real situation, however, in the majority of cases aligning an LPO to an internal alignment line of another LPO is likely to visually break the latter into a few groups. So, in this case this compound LPO should be broken into corresponding smaller ones.

According to an embodiment, a system implementation can utilise PDF (Portable Document Format) documents as the base documents for analysis, due to their wide acceptance as a portable, well-defined and stable document standard. Other alternatives are possible as will be appreciated by those skilled in the art. The implementation begins by extracting characters and words, and combining them into lines and blocks of text to recreate the low-level atomic elements of a page. According to an embodiment the extraction of characters and words can be implemented using the method described in H. Chao, J. Fan, Layout and content extraction for PDF documents, Lecture Notes in Computer Science, Document Analysis Systems VI, pp 213-224, Berlin/Heidelberg, 2004. However, to extract essential alignment lines these primary objects should be further combined into LPOs that may contain mixtures of text blocks in different font and sizes, images and graphics.

Each primary object is likely to have a mixture of alignment lines, some of which could be contributing. The objective is: starting from a set of primary objects, identify their edges that could potentially be contributing. Next rules are defined to combine neighboring primitives. According to an embodiment, when two objects are combined into one, their shared edge is converted into an internal line. Thus, the process of successively combining objects is designed to eliminate all non-contributing lines. The result should converge to the LPO set of a document as accurately as possible. Special care is taken to avoid collateral damage to other alignment lines of joined objects. For example, if alignment lines adjacent to the eliminated edge exist, then they should be combined. Merging two blocks of text is equivalent to treating their shared edge as a non-contributing alignment line, whilst preserving their other edges intact. The main objective is to determine which neighboring blocks of text can be merged together, such that contributing alignment lines are not lost.

Alignment lines generated by the edges of primary text blocks depend on the text alignment inside the block. Text objects may be aligned to the left, to the right, or both (justified), with corresponding alignment lines generated. Text blocks also generate top and bottom alignment lines.

According to an embodiment, the processing steps are:
1. Extract characters, words and construct lines and primary text blocks by following the strategy described above;
2. Add the end of a paragraph (last incomplete line) and heading, if it exists, and is not well separated to form an independent object;
3. For each primary block of text define potentially contributing lines: select relevant ones from the top, bottom, flush-right, flush-left;
4. Sort the objects left-right, top-bottom to identify immediate neighbors for each object;
5. Merge each pair of neighboring objects into one compound object if the following conditions are met:
(a) the blocks of text are relatively close to each other without interrupting objects;
10(b) they have relatively similar properties (for example, font sizes differ by no more than an acceptable difference for a paragraph and its heading);
(c) their internal text alignment is similar (flush-right, flush-left, justified).
6. Repeatedly join neighboring blocks of text until no further pairs can be combined.

The result of the processing steps as applied to FIG. 3a are shown in FIG. 3d.

Figure 5C:
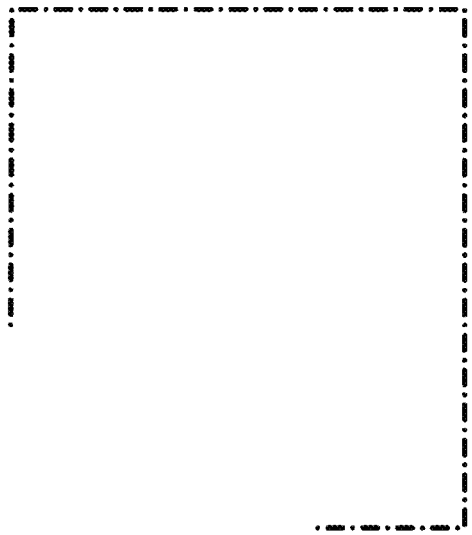
FIGS. 5a-c depict an original image (5a), with contributing alignment lines shown (5b), and the corresponding LPO (5c)
Figure 5B:
Figure 5A:
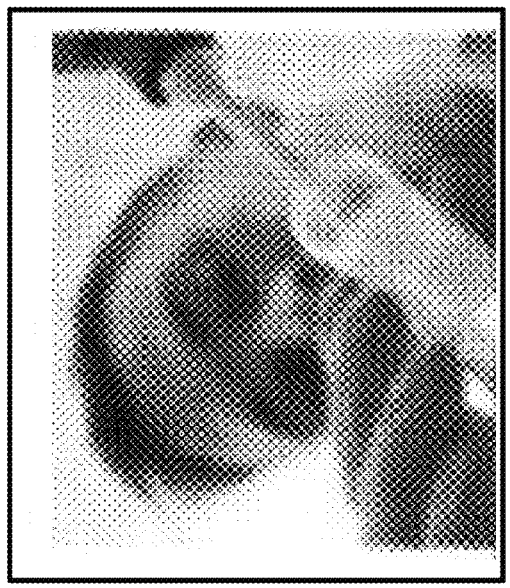

According to an embodiment, it is desirable to extract visible horizontal and vertical outer edges of images, when they exist. The situation with alignment lines generated by images is more problematic than with those generated by text. In the simplest case, image based alignment lines are generated as a result of luminance or color changes between an image border and its immediate surroundings. However, often this change occurs only over some parts of an image border making an imperfect instance of a line as illustrated in FIGS. 5a-c for example. For some images the situation is further complicated by insufficient changes in color or luminance along their borders. This is often due to either approximate matching of image colors to surrounding background, or some image colors being set to transparent. In any of these situations the actual image borders become invisible. For example, an image which is surrounded by white space which matches the document background. According to an embodiment, if lines from images are to contribute to the alignment of a page, the dimensions of bounding boxes of images need not always be used in isolation.

Figures 6A, 6B, 6C:
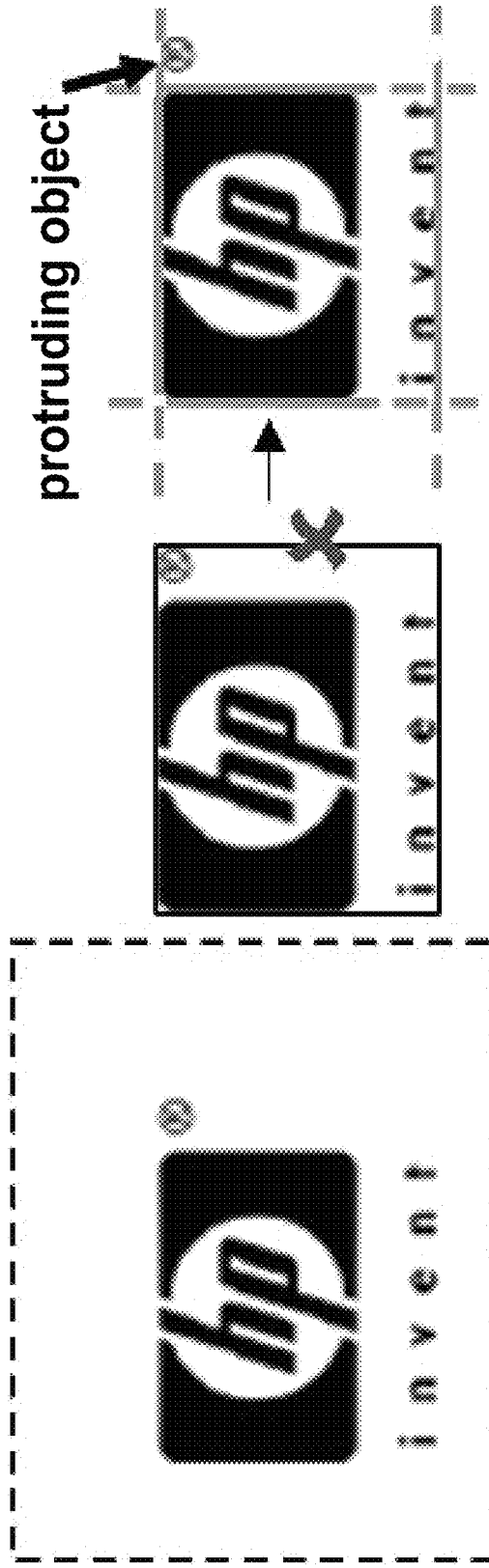
FIG. 6 is an image of a logo showing an image actual boundary (6a), alignment lines extracted by eliminating white space (6b), and proper alignment lines.

When sides of the bounding box of an image do not contribute to document alignment lines, then internal image edges or imperfect lines, if they exist, could contribute to document alignment. It is likely that internal image edges (if straight) closest to the corresponding border will contribute toward document alignment. However, such edges might not necessarily be the closest to the border fragment: other relatively small image objects could be even closer. For example, the situation is illustrated in FIGS. 6a-c, where the registered trademark symbol appears outside the contributing alignment lines. Such small objects may visibly protrude outside the perceived bounding box and thus make it impossible to decide whether an alignment line exists or not by simply checking the first significant color or luminance change when progressing from the boundary. In order to deal simultaneously and homogeneously with all possible image generated alignment lines we introduce a new notion: image working area.

The image working area is the visible area of an image surrounded by a fixed width border extracted from the immediate background image. If an image is well separated from other page objects, the width of the added border can be defined such that any other page objects are not included in the image working area. According to an embodiment, determining an image working area will preserve the drawing order with which images are marked on the page, as otherwise this might result in some images being completely or partially overlapped.

Accordingly, to describe the processing steps it is helpful to introduce some more useful notations:

A scan line is a sequence of pixel values selected from an image working area, starting at a border of this area and propagating towards the center perpendicular to this border. The scan line can be used to detect edges in an image, which can in turn be used to determine the image boundary. According to an embodiment, the processing steps for determining a bounding box of an image using scan lines in an image working area are:
1. Crop the image against the page's crop box and viewable area;
2. Identify image working area;
3. Detect extreme horizontal and vertical edges by:
   (a) For each edge of the working area in turn (left, right, top, bottom) and each scan line for the corresponding edge calculate the difference between adjacent pixels in the scan line and mark those judged to be outside the difference threshold; the results are accumulated in a matrix M, where a matrix M is created for each edge;
   (b) Scan the matrix M for groups of adjacent cells in the same column (for left/right scan matrices) or row (for top/bottom scan matrices), which has at least a minimum length and a minimum percentage of marked cells (the coverage density);

(c) Calculate the bounding box and extreme alignment lines from the coordinates of the corresponding patches, where a patch is a group of adjacent cells in the same column (for left/right scan matrices) or row (for top/bottom scan matrices).

Figure 7:
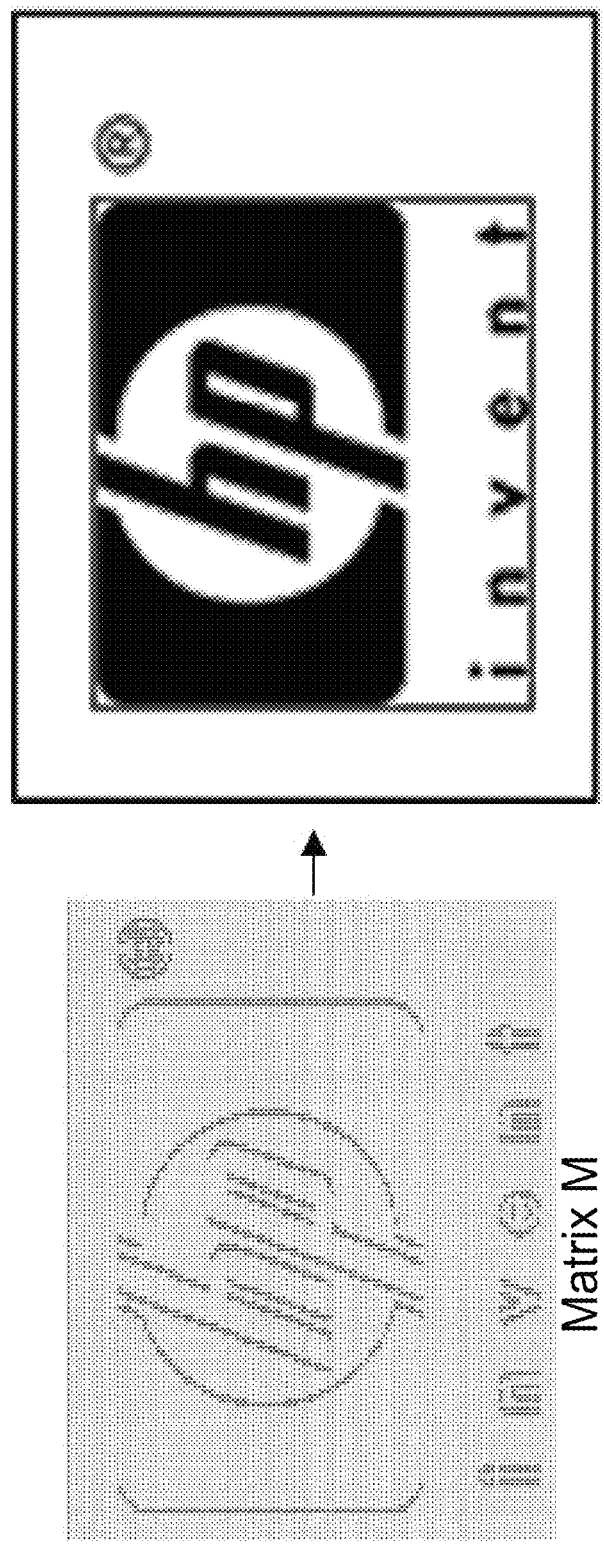
FIG. 7 is a schematic representation of a logo in which edges have been identified in order to determine alignment lines generated by the image.

FIG. 7 is a schematic representation of a logo in which edges have been identified in order to determine a bounding box for the image. The procedure has correctly identified the bounding box for the image, and neglected to include the registered trademark part of the image, which does not contribute to alignment lines for the image. This approach will identify edges even for imperfect lines, for example for dashed lines or text-inside-image. The algorithm can be augmented by applying the Hough transform for illusory contours as will be described below.

Similar to text blocks, two neighboring images could appear as a single visual unit and thus must be merged together. The merge conditions are very similar to text blocks: in close proximity, fully shared edge and common alignment lines for edges adjacent to the shared edge. The situation is further enforced by the absence of a strong alignment edge on, or around, the shared edge of images.

Figure 8A:
FIG. 8a-c depict bounding boxes of a Bezier curve defined by the end points of the curve only (8a), by the combination of the control and end points (the convex hull built on this points) (8b), and the tightest box (8c)
Figure 8B:
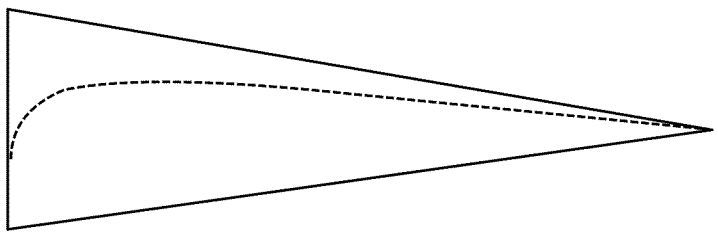
Figure 8C:
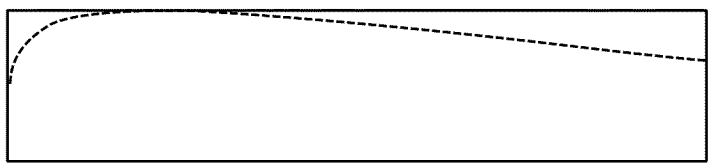

Processing vector paths follows a similar pattern to the method described for images above. Each path is painted onto the same background raster that was used to detect edges within images, and then exactly the same algorithm is applied to detect the edges of the vector graphics. However, we must first decide on the correct area of the page on which to do our search for edges. If we were to simply use the end points of a path, some of the path can be missed as shown in FIG. 8a example. A first approximation is to construct a bounding box from the convex hull, FIG. 8b. According to an embodiment, the convex hull is created by forming a bounding box around all end points and control points in the path, then a loose bounding box is found from the extreme of the convex hull. Alternatively, a bounding box can be achieved by calculating the extrema from the mathematical equation of each path segment, thus giving the tightest bounding box as shown in FIG. 8c.

As a part of the homogeneous merging strategy graphical objects that are adjacent to each other are merged. The implementation defines adjacent to each other to mean objects where the corresponding bounding boxes have a common edge. Small tolerances allow for minor misplacements and failure in detection by the human eye. Where tolerable discretion is used, the amalgamated object takes its size from the extremes of the original objects.

Figure 9:
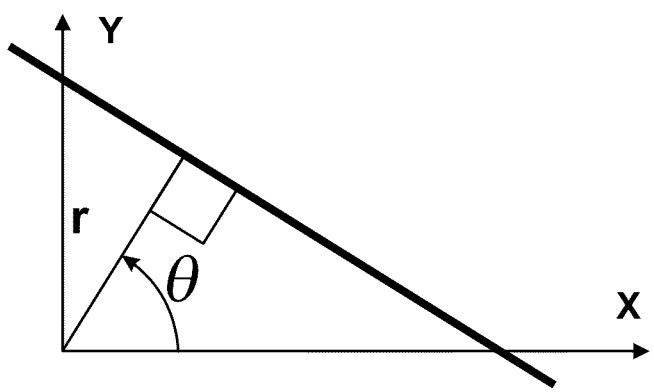
FIG. 9 is a schematic representation of the parameter space of the Hough transform.
Figure 10:
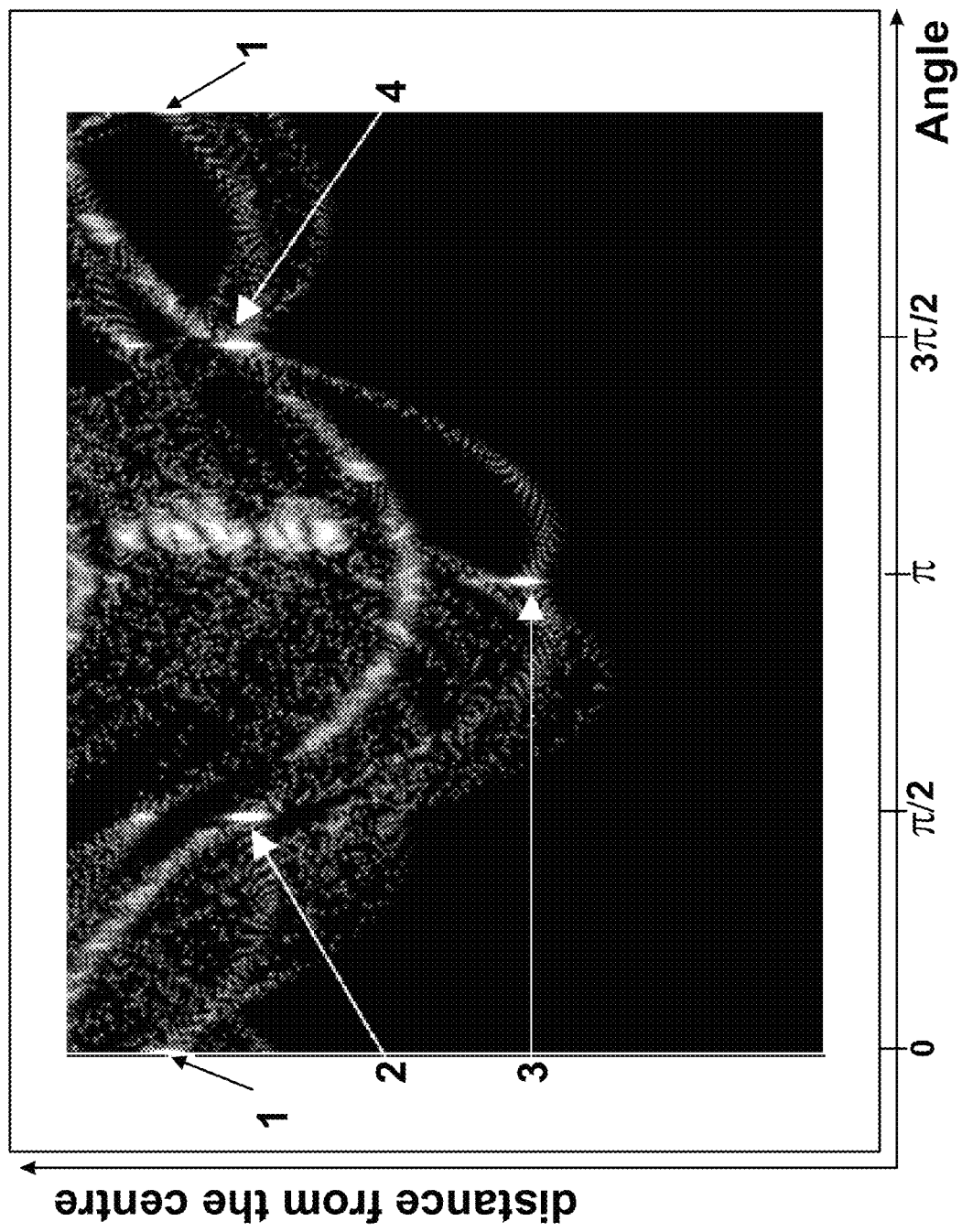

The Hough transform is a well known image processing algorithm for finding imperfect objects of a certain shape using a voting procedure. For example, the approach described in R. Duda, P. Hart, "Use of the Hough Transformation to Detect Lines and Curves in Pictures", Communications of the ACM, v. 15, pp. 11-15, 1972, ACM, the contents of which are incorporated herein in their entirety by reference, can be used. Remarkably enough alignment lines (which are partially drawn lines) are the simplest imperfect shape that can be successfully found using this transform. With reference to FIG. 9, which depicts a schematic representation of the parameter space of the Hough transform, the equation of a line in the normal form is given by:

$$x \cos a + y \sin a = r; r >= 0;$$

where r is the distance from the line to the origin and a is the angle between X-axis and the normal to the line. The generalized Hough Line transform converts the problem of detecting collinear points to the problem of finding concurrent curves. For each pixel and its neighborhood, if there is enough evidence of an edge, then votes are accumulated. The results of this procedure are represented in the Hough map, where the intensity of a pixel reflects the number of votes it received relative to the pixel with the most votes. For example, the Hough map of FIG. 6a is shown in FIG. 10. Moreover, from all detected lines we are only interested in verticals, where $a=0$ or $\pi$ and horizontals $a=\pi/2$ or $3\pi/2$. According to an embodiment, from those alignment lines we only want to extract those closest to the image edges, thus r is either min or max within corresponding angles. Alignment lines of FIG. 6a correspond to the bright spots (1, 2, 3, 4) with the same numbers in the Hough map depicted in FIG. 10.

Apart from extracting alignment lines for images and rasterized graphics, the Hough algorithm can be used to extract and evaluate alignment lines for a whole document when treated as an image according to an embodiment. A voting score, reflected by the intensity in the Hough map, directly corresponds to the strength of an alignment line: the stronger alignment line is marked by a higher intensity in the Hough map. In a full document evaluation we are generally interested in vertical and horizontal alignment lines, so, according to an embodiment, consider $a=0$; $\pi/2$; $\pi$; and $3\pi/2$. However, all bright spots in a map can be considered and not only those at the outer edges.

The real contributing alignment lines emerge as a result of mixing and complementing the deep content analysis and the Hough transform on the overall document, and image levels: essential alignment lines are identified by both methods according to an embodiment. We can now evaluate document alignment. There are four major aspects of document alignment and regularity to be considered:

1. Connectivity graph of page composition: identify disconnected LPOs or disjoined groups of LPOs;
2. Grid proportionality and its potential defects, for example, alignment lines that are too close;
3. Alignment quality (strength) of edges relevant for the document style and locality; and
4. Comparison of alignment statistics with corresponding precept for the document style and type.

According to an embodiment, in a well aligned document, objects should be aligned with other objects of the composition, i.e. every LPO should be aligned with one or more LPOs on a page. For some types of documents this requirement can be relaxed. For example, it can be tolerable to have some small number of objects that either are not connected or form some separate disconnected groups, with objects inside each group that are aligned with each other. To formalize this requirement for an arbitrary document we introduce a graph G with LPOs as its vertices. An example is depicted in FIG. 11, which schematically depicts a document in the form of LPOs and the corresponding connectivity graph, G.

Figure 11:
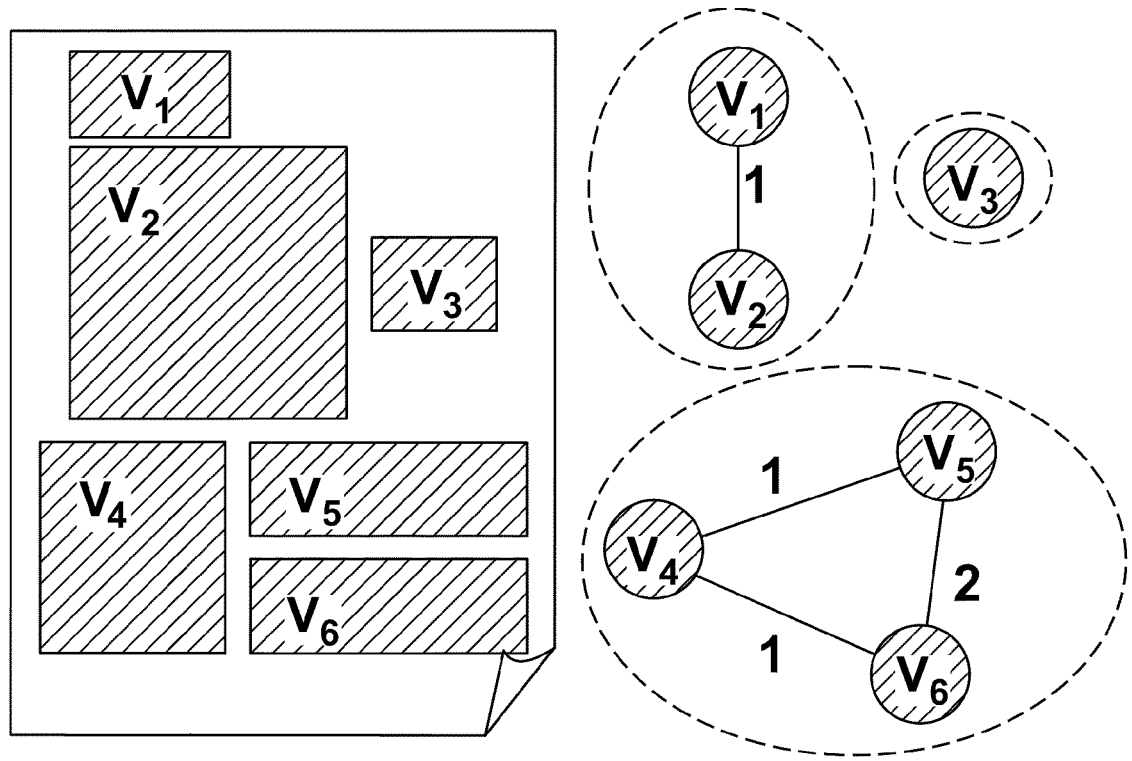
FIG. 11 is a schematic representation of a document in the form of LPOs and the corresponding connectivity graph, G.

With reference to FIG. 11, every two vertices $v_1$ and $v_2$ are connected by edge $v_1$-$v_2$, if objects $v_1$ and $v_2$ share an alignment line. Two objects can share 1 or 2 alignment lines, as shown in FIG. 11, which is indicated by the weight associated with every edge. In terms of graph G of FIG. 11 this means that every vertex is connected by at least one edge, i.e. there are no isolated vertices. This condition can be relaxed or reinforced through style requirements: for example, a weaker requirement is to allow no more than one object to break this rule so there is no more than one isolated node. The overall graph for a good composition is expected to be connected or at least to consist of a few connected sub-graphs. The required (acceptable) graph connectivity for a particular document is defined through its style (the expected values for the particular class).

From the graph we can also evaluate other statistics that can be used directly to score the page. For example:
- Number of sub-graphs and their numbers of nodes and edges
- Number of disconnected components
- Number of edges with weight equal to one or bigger than one
- Maximum/average number of edges from one node These statistics may be compared with acceptable limits for the document type and style. For different document types one-directional graphs for horizontal and vertical alignments could be considered jointly or separately. To visualize this concept imagine each LPO on a page to be cut from a piece of metal, and every alignment line is replicated by a thin rod that connects to corresponding LPOs. Then, for a well aligned page the entire composition can be lifted up by just holding it at one point. However, if there are isolated nodes or more than one piece, then they will drop out.

The quality of edge alignment lines is a very important issue. Document edges form the outer shape of a document. They are one of the first vital clues to the nature of a document. The shape of a document can vary from a formal, well-formed rectangle to an arbitrary artistic figure. As a result of the left-to-right reading pattern in the English language, the left edge of a document—the starting point for document comprehension and its first scan line—is the most important for English-like languages. For languages with other reading patterns the corresponding edges become more important.

Whilst in the majority of cases document edges are formed by the outer most edges of a document's objects, there is one caveat to be avoided. A document edge could be mistakenly evaluated as low strength due to one or a few small protruding objects such as an image and/or a small portion of text for example. According to an embodiment, the issue can be addressed by evaluating the strength of a few alignment lines sequentially from the corresponding document edge. If the first one or the first few lines are very weak, but they are followed by a relatively strong alignment line in close vicinity of the edge, then it is very likely that this strong line will and should be perceived as a document edge.

A document grid provides an underlying organizational structure for the document. The grid ratio is a relationship between two or more grid measurements. Document cohesiveness is achieved through grid proportionality and size repetition. Through size similarity and proportionality an immediate correspondence between page objects is established.

Figure 12:
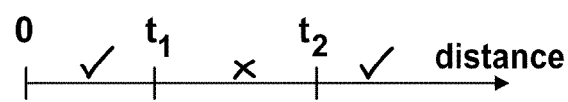
FIG. 12 is a schematic representation of acceptable distances between two neighboring alignment lines, either below a visibility threshold $t_1$ or well separated (above $t_2$)
Figure 13C:
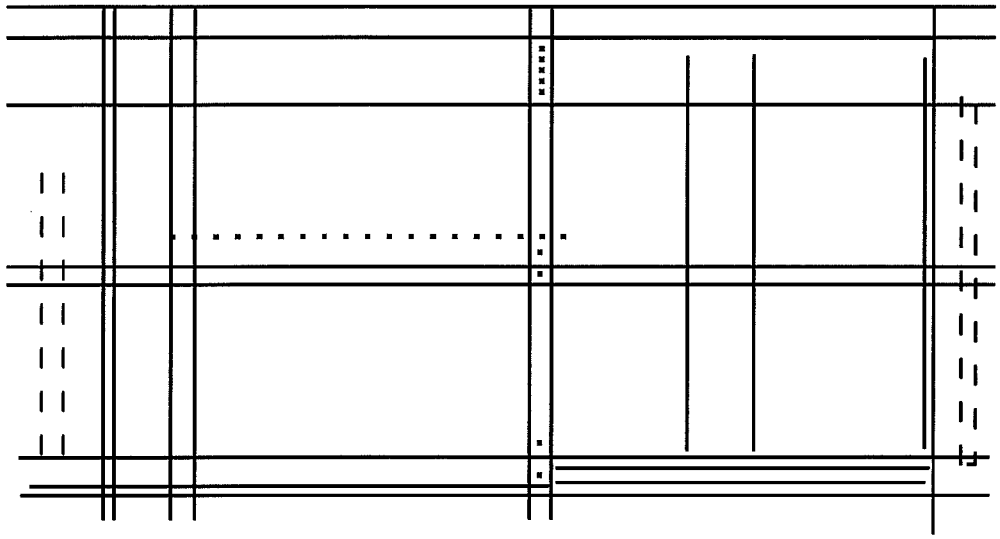
FIG. 13 is a schematic representation of an original document (13a), its extracted grid on the top of the document (13b) and on its own (13c)
Figure 13B:
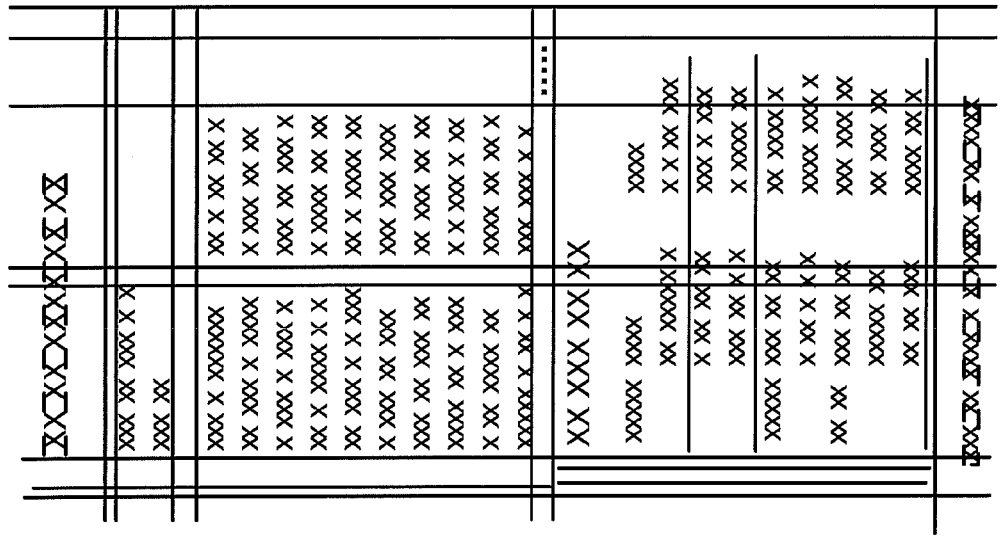
Figure 13A:
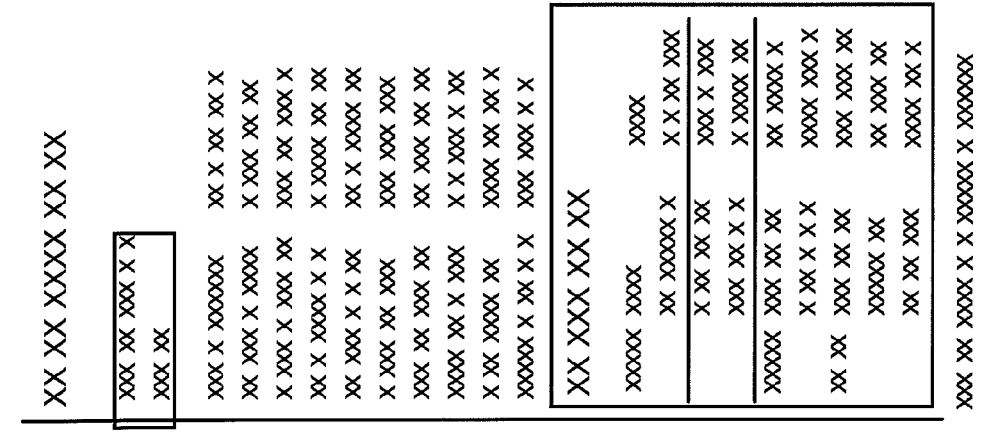

A document grid is comprised of sequential distances between any two neighboring alignment lines. If the distance between two neighboring alignment lines is beyond the eye resolution, then they are treated as one generalized alignment line. For a well aligned document it is desirable that any two distinct neighboring alignment lines (whose distance is above the visibility threshold) are well separated. An acceptable distance between two neighboring alignment lines is illustrated in FIG. 12, where $t_1$ is a visibility threshold and $t_2$ is the minimal acceptable distance for a particular document type. Horizontal and vertical proportionality can be evaluated separately and jointly. FIG. 13 illustrates an original document (13$a$), its extracted grid on the top of the document (13$b$) and on its own (13$c$).

Figure 14:
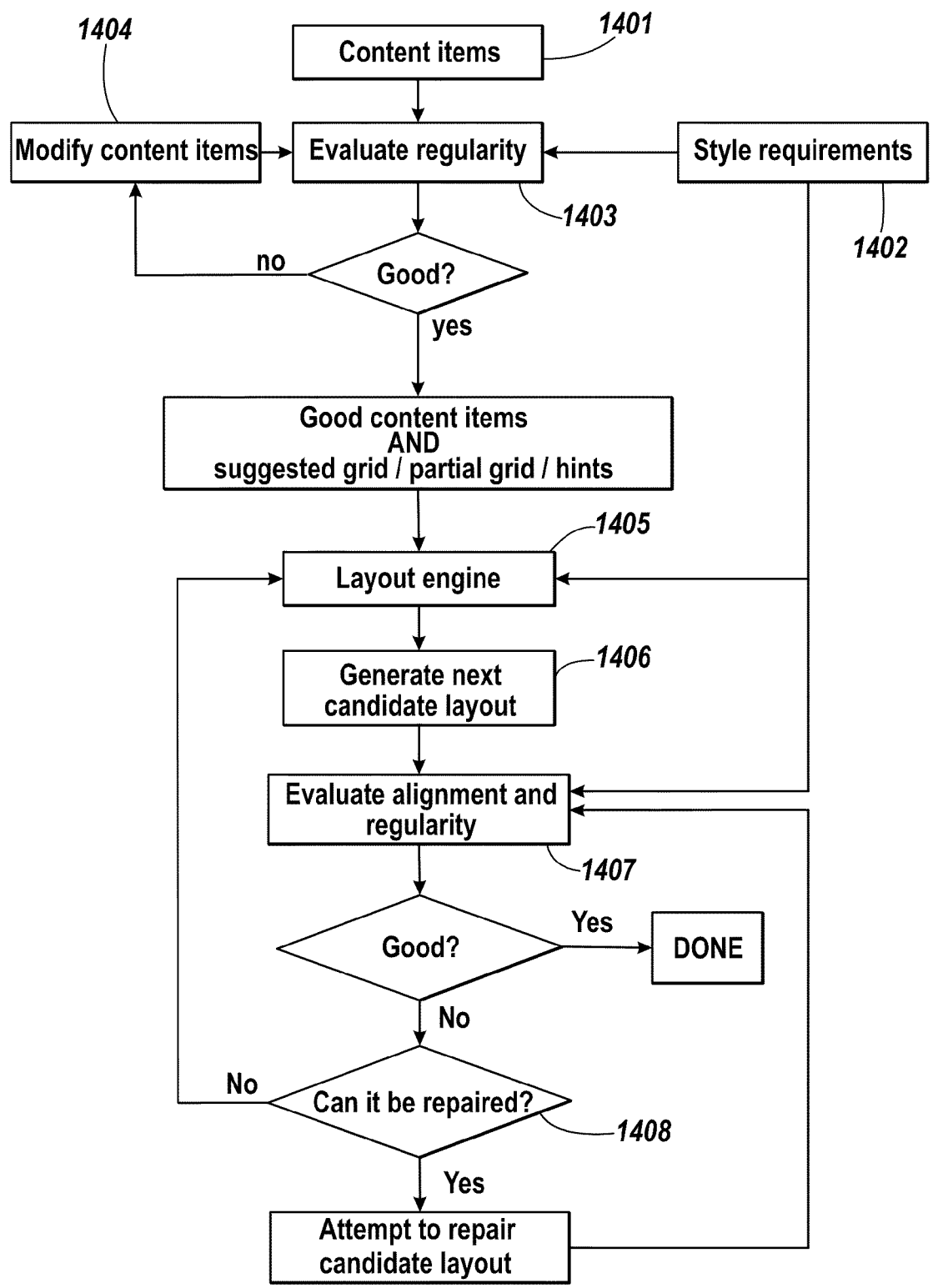
FIG. 14 is a flow chart depicting a method of evaluating the regularity of content items of a document according to an embodiment.

FIG. 14 is a flow chart depicting a method of evaluating the alignment and regularity of content items for a document according to an embodiment. A set of content items for a document are provided as described above and form input to the system at step 1401. At 1402 style requirements for a generated document are provided. The style requirements define the desired formatting requirements for the document to be generated. More specifically, the style requirements can define, amongst other things, requirements relating to sizing and spacing constraints for content items for example.

At step 1403 the style requirements are applied to the content items in order to generate a partially formatted document. If the partially formatted document has an acceptable regularity, the process proceeds, otherwise the content items can be modified with the constraints of the style requirements (step 1404) in order to arrive at a modified solution. The applied style requirements can result in an acceptable regularity if, for example, all content items can be placed on an imaginary grid for the document with acceptable spacing between content items.

At step 1405, the regularized content items are input to a layout engine. The layout engine also takes as input the style requirements of 1402. The layout engine takes the content items and, using the approach described above for defining the alignment of content items for a document, generates a proposed layout (1406) for the document, taking into account the style requirements. The proposed layout provides a document in which content items are regularized and aligned according to the requirements described above.

At step 1407 the proposed layout generated at 1406 is evaluated in order to determine if the alignment and regularity of the content items is acceptable. For example, a measure for acceptable alignment can comprise a combination of four factors:
- Statistics per alignment line
  - Amount of alignment lines
  - % of single, double and other alignment lines, etc.
- Quality of left and right edges
  - More than 50% of the height is covered by left sides of the most left objects lying on the same alignment line
- Amount of co-alignments per object and connectivity
  - Every object has at least two sides co-aligned with other objects on a page—otherwise it seems to be out of place
- Quality of grid:
  - Distance between parallel alignment lines <2 mm or >5 mm
  - Other properties If the layout is acceptable, the process ends, and the document is output. For example, the document can be output to a digital printing press for printing, or can be output in digital form for distribution. If the layout is not acceptable and can be repaired (1408), the layout engine generates a further candidate layout for evaluation. This can repeat until either an acceptable layout is generated, or no further layouts are possible within the constraints imposed and given the content items in question.

According to an embodiment, the determination of the regularity of content items in a first configuration for a document can proceed as a stand alone operation in a document layout system, or as part of a more complex layout procedure in which a document layout is fully generated as described above. For example, a regularity module can be provided in order to provide a measure of the regularity for a configuration of content items. The regularity module can be configured to provide data representing the measure to a document layout system as a 'plug-in' module, either configured in hardware or software.

Figure 15:
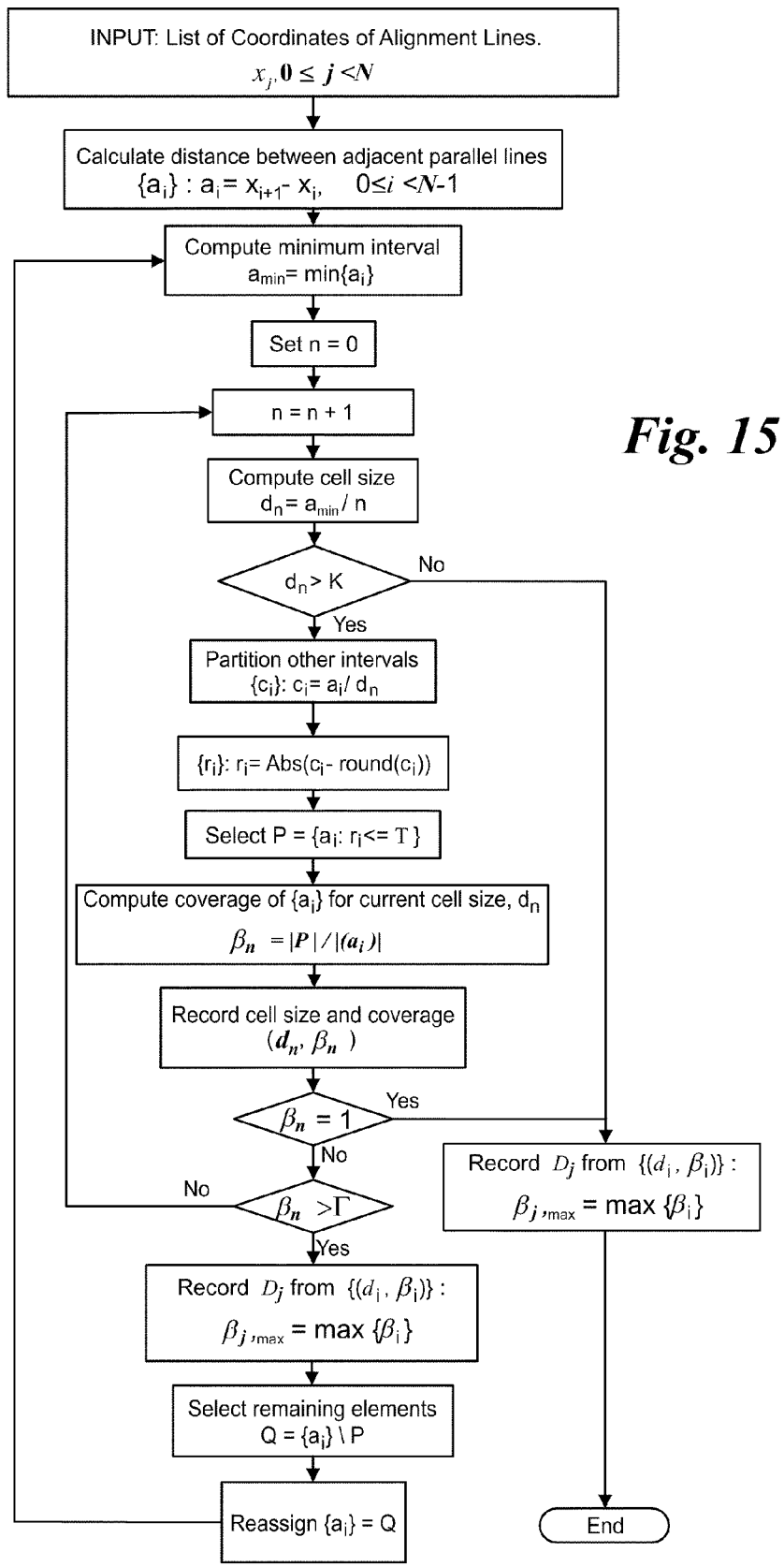
FIG. 15 is a flow chart representing a method for identifying possible proportionality relationships among cell sizes.

According to an embodiment, FIG. 15 is a flow chart representing a method for identifying possible proportionality relationships among cell sizes. This process creates a new unit cell size by dividing the smallest interval into equal sub cells and accepting intervals that are multiples of this unit value. The steps are repeated until either a preset minimum grid size is reached or until all of the alignment intervals match some grid unit. When a break occurs we backtrack to the unit size where the greatest number of intervals fitted, then remove all fitted intervals and recursively perform the steps with the remaining intervals.

Grid proportionality evaluation, where T is the grid alignment tolerance, $\lceil$ is the minimum coverage, K is the minimum cell size, N is the length of the original list; and $T; \lceil; K; N \in R^+$ and $0 \leq \lceil \leq 1$.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below.

What is claimed is:

1. A method for generating a document, comprising:
   receiving a first configuration of the document that includes a set of content items;
   generating, using a processor, alignment data representing a measure for an alignment of the content items in the first configuration, the alignment data including a plurality of alignment lines; and
   determining, using the alignment data, whether the content items are aligned with one another with an acceptable alignment, wherein the content items are determined to be aligned with one another with an acceptable alignment when a distance between any two adjacent alignment lines of the plurality of alignment lines is less than a first defined value or greater than a second defined value;
   wherein generating the alignment data comprises:
      using the processor to determine a set of collinear points for the first configuration defined by the edges of the content items; and
      using the determined set of points to generate the plurality of alignment lines for the first configuration;
   wherein the first defined value is 2 mm and the second defined value is 5 mm.

2. The method as claimed in claim 1, further comprising:
   on the basis of the determination that the content items are not aligned with one another with an acceptable alignment, generating, using a layout engine, a second configuration for the document, wherein the second configuration is different from the first configuration.

3. The method as claimed in claim 1, further comprising:
   using the processor to generate regularity data representing a measure for the disposition of content items in the first configuration; and
   using the regularity data to determine if the content items are positioned relative to one another in a way which is commensurate with a predefined style definition for the document.

4. The method of claim 1, wherein the first defined value comprises a visibility threshold and the second defined value comprises a minimal acceptable distance between adjacent alignment lines for a particular document type.

5. A document layout system for generating a document, comprising:
   a hardware processor to:
      provide a set of content items in a first configuration for the document;
      generate alignment data representing a measure for an alignment of the content items in the first configuration, the alignment data including a plurality of alignment lines; and
      using the alignment data, determine whether the content items are aligned with one another with an acceptable alignment, wherein the content items are determined to be aligned with one another with an acceptable alignment when a distance between any two adjacent alignment lines of the plurality of alignment lines is less than a first defined value or greater than a second defined value;
   wherein to generate the plurality of alignment data, the hardware processor is to:
      determine a set of collinear points for the first configuration defined by the edges of the content items; and
      generate the plurality of alignment lines for the first configuration using the determined set of points;
   wherein the first defined value is 2 mm and the second defined value is 5 mm.

6. The document layout system as claimed in claim 5, wherein the hardware processor is to generate, on the basis of the determination that the content items are aligned with one another with an acceptable alignment, a second configuration for the document, the second configuration different than the first configuration.

7. The system of claim 5, wherein the first defined value comprises a visibility threshold and the second defined value comprises a minimal acceptable distance between adjacent alignment lines for a particular document type.

* * * * *